Aug. 27, 1968  W. R. CONLEY, JR., ET AL  3,399,135
METHOD OF REMOVING SOLIDS FROM LIQUIDS
Filed Sept. 29, 1967
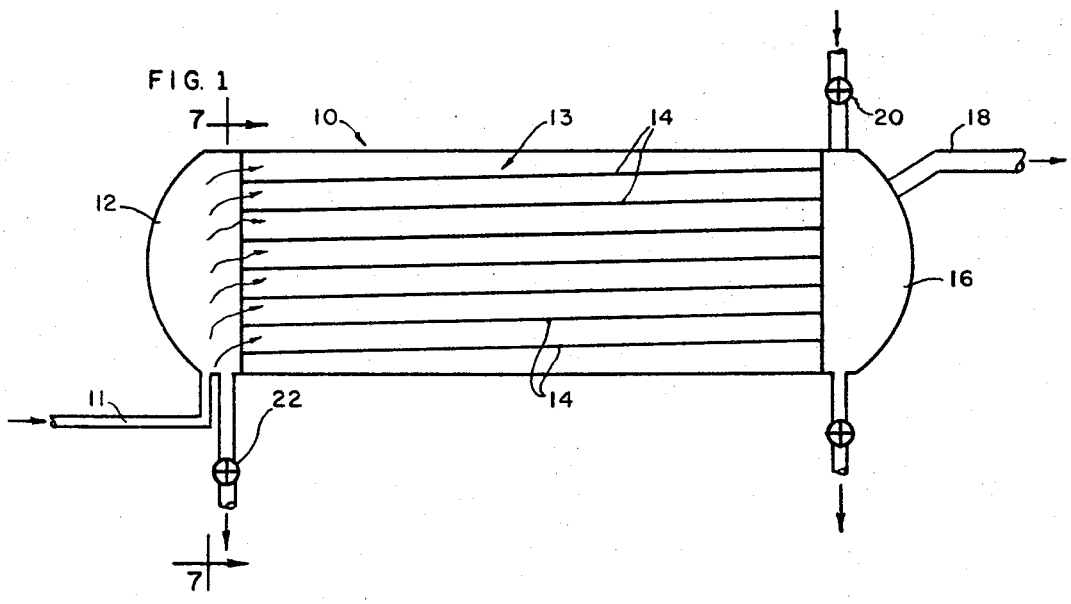
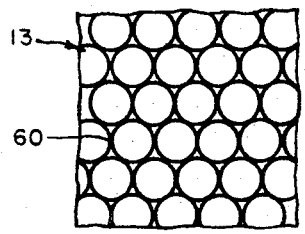
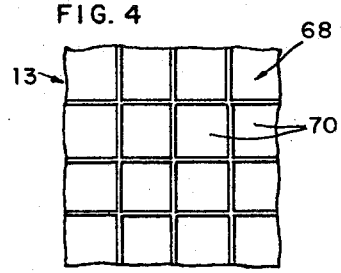
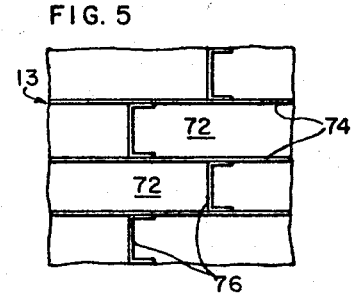
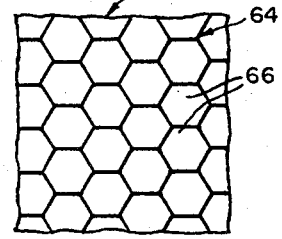
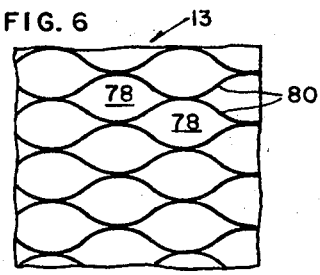
INVENTORS,
WALTER R. CONLEY, JR.,
SIGURD P. HANSEN,
ROBERT D. SCHILLING,
RICHARD H. EVERS,
ARCHIE H. RICE
BY
BUCKHORN, BLORE, KLARQUIST & SPARKMAN
ATTORNEYS

# United States Patent Office 3,399,135
Patented Aug. 27, 1968

3,399,135
METHOD OF REMOVING SOLIDS FROM LIQUIDS
Walter R. Conley, Jr., Sigurd P. Hansen, Robert D. Schilling, Richard H. Evers, and Archie H. Rice, Corvallis, Oreg., assignors to Neptune Microfloc, Incorporated, Corvallis, Oreg., a corporation of Oregon
Continuation-in-part of application Ser. No. 553,401, May 27, 1966. This application Sept. 29, 1967, Ser. No. 675,742
6 Claims. (Cl. 210—42)

ABSTRACT OF THE DISCLOSURE

Liquid carrying solids is passed at slow rate through honeycomb of tubes of restricted diameter to permit solids to deposit within tubes. Restricted diameter of tubes causes self orificing to utilize complete storage capacity of tubes. Tubes cleaned by draining inlet plenum, tubes being inclined upwardly from such plenum.

---

This application is a continuation-in-part of application Ser. No. 553,401, filed May 27, 1966, now abandoned.

Background of the invention

This invention relates generally to the treatment of liquids which are carrying suspended solids, such as turbid raw waters, domestic sewage and industrial wastes. More particularly, the invention relates to an improved method and apparatus for removing settleable particulate matter as well as flocculated colloidal and dissolved substances from such liquids prior to filtration.

Water containing a large amount of suspended or turbid material cannot be efficiently clarified merely by passing it through a filter. The suspended matter must first be chemically coagulated or flocculated, and then allowed to settle by gravity under quiescent conditions. In order to accomplish this, the flow velocity must be reduced and this has been done heretofore by utilizing large settling tanks or basins which because of their size can hold the water for the requisite period of time.

The settling basins heretofore known have been of two general types. The first type utilizes the horizontal flow of water. The flocculated material is allowed to settle and accumulate at the bottom of the tank while the clarified water is drawn off at the top. Periodically or continuously, depending upon the design, the sludge is removed. These horizontal flow tanks are usually designed to have a volume that will hold between two and six hours of normal flow and thus range between 10 and 15 feet deep.

The other general type of settling tank is known as a vertical clarifier and is designed to increase the floc contact opportunity by moving the coagulated material upwardly through a sludge blanket. The coagulated material settles downwardly against an upward flow of water which flows out of the top of the tank clarified, while the sludge is withdrawn from the bottom. The increased efficiency of a vertical clarifier permits detention times as low as one or two hours.

Horizontal settling tanks have the advantage of stability when flow rates change or when thermal currents impart vertical movement to the water contained therein. The inertia of the incoming liquid, however, often reduces the efficiency of the horizontal tank by inducing eddy currents therein. The vertical clarifier type of settling tank results in some savings in space as compared to the horizontal type of tank because of the shorter settling time required, and thus is more economical. However, the vertical clarifier is not as resistant as the horizontal basin to sudden changes in flow rate or to the formation of local eddies induced by thermal and density currents. Thus, the potential savings that should result from use of a vertical clarifier type of settling tank are often not achieved.

Both types of settling tanks are generally left uncovered and are thus subject to disturbing wind-induced currents, thermal currents and density currents, all of which combine to reduce efficiency. In addition, with both types of tanks, the removal of sludge is costly if mechanical devices are used, or tedious and slow if manual methods are used. Furthermore, the large capacity required for both types of tanks requires considerable areas of land. Typically, surface clarification rates of 0.5 to 1.0 gallon per minute per square foot are used for design purposes. Some manufacturers claim that their units may achieve flows of up to 2.0 gallons per minute per square foot. These values, however, generally have been obtained only under ideal settling conditions.

The clarification of dilute suspensions of flocculated particles, such as those formed naturally in biologically treated sewage or those produced by chemical coagulants in the treatment of water, is a function not only of the settling properties of the individual particles, but also of the flocculating characteristics of the suspension. Particles coalesce and become heavier as they bump together within the liquid. The settling velocity of the clusters so formed is increased, and they are thus more readily removed. Heretofore, the settling requirements that have been considered in the design of conventional settling basins have required that the subsidence velocity of the smallest particles must be greater than the upward component of the velocity of the liquid within the basin, such as the velocity of upward flow to the collection weirs that are typically employed. Meeting these requirements has consequently resulted in the large bulky settling tanks above described, which tanks require large amounts of space and are expensive to construct and install.

Summary of the invention

It is thus the principal object of the present invention to provide an improved method and apparatus for removing suspended or flocculated turbid material from a carrying liquid, which method and apparatus will function efficiently even when operating at a relatively high flow rate per unit volume.

It is a further object of the present invention to reduce the volume requirements of settling apparatus by increasing the production per unit volume while maintaining a satisfactory degree of settling process efficiency.

It is a still further object of the present invention to provide an improved method and apparatus for removing suspended or turbid material from water, which method and apparatus will substantially reduce the settling time required as compared with existing methods and apparatus.

It is a still further object of the present invention to provide an improved method and apparatus which will result in reduced space requirements and consequent reduction in the area of land required.

It is a still further object of the present invention to provide an improved settling apparatus that will be compact enough to be fully enclosed, thereby to be readily adaptable for use in arctic climates.

These and other objects and advantages are achieved in accordance with the embodiments of our invention illustrated herein by providing a settling apparatus comprising a closed elongated tubular structure having an inlet opening at the upstream end thereof and an outlet opening at the downstream end thereof, the tubular structure being inclined slightly upwardly in the direction of flow therethrough. The tubular structure comprises a plurality of elongated, generally horizontally extending tubes uniform in cross section throughout their length and through which the liquid is passed in a relatively shallow stream, but at a slower velocity than the flow immediately upstream from the tubes, such that laminar flow is maintained whereby the solids will settle to the bottoms of such tubes. The tubes are of restricted cross section (not over about seven square inches) whereby they are self-orificing to obtain uniform distribution of settled material through all of the tubes. The tubes are cleaned by backdraining the tubes.

Drawings

FIG. 1 is a schematic view of a tubular settling apparatus designed in accordance with the present invention;

FIG. 2 is a cross-sectional view through a tubular structure suitable for use in the settling apparatus of FIG. 1;

FIG. 3 is a cross-sectional view through another tubular structure suitable for use in the settling apparatus of FIG. 1;

FIG. 4 is a cross-sectional view through still another tubular structure suitable for use in the settling apparatus of FIG. 1;

FIG. 5 is a cross-sectional view through still another tubular structure suitable for use in the settling apparatus of FIG. 1; and FIG. 6 is a cross-sectional view through still another tubular structure suitable for use in the settling apparatus of FIG. 1.

Description of preferred embodiments

Referring to the drawings and in particular to FIG. 1, the settling apparatus 10 of the present invention consists of an inlet pipe 11, which discharges into a chamber or inlet reservoir or plenum 12, which distributes the liquid and suspended material carried thereby to a tubular structure 13 comprising a plurality of generally horizontal settling tubes 14. The suspended solids carried by the liquid are deposited on the bottom surfaces of the settling tubes 14, and the thus clarified liquid is discharged into a chamber or exit reservoir or plenum 16, from which it flows out of the apparatus through a pipe 18.

The depth of the tubes 14 in general will vary from about ½ inch to about 3 inches, depending, in part, on the settling characteristics of the suspended matter. The optimum depth for removing flocculated turbidity from raw waters, for example, has been found to be in the range from ½ inch to 2 inches. The tubes preferably are inclined slightly upwardly in the direction of flow therethrough to facilitate backdrainage and removal of settled matter, as will be more fully discussed hereinafter. The tubes may be sloped at an angle from about one degree to about thirty-five degrees, an angle of between about five to ten degrees being preferred.

The tubes can range in length from 2 to 10 feet, but only a slight additional increase in the percentage reduction in turbidity is achieved with a settling tube longer than about 3 feet. We have found that if material will settle at a reasonable throughput velocity, it will do so in approximately 3 feet of tube length. If an exceptionally slow settling material is present, longer tubes, say up to 10 feet in length, may be desirable, but to facilitate cleaning by drainage a maximum length of six to eight feet is preferred.

The settling apparatus 10 can be designed and operated to remove from 75 to 95% of the coagulated material, although the amount actually removed will, of course, depend upon the nature and relative turbidity of the water entering the tube. In general, the influent to the settling apparatus will contain particles which settle at rates of from 5 to 30 feet per hour, and such is passed through the inlet pipe 11 at a velocity not to exceed one foot per second. A velocity not to exceed 0.035 foot per second preferably is maintained in the settling tubes 14; at such velocity the liquid flowing through the settling tubes will assume what is known as streamline flow.

The apparatus is operated until the amount of solids deposited on the bottom surfaces of the tubes either interferes with efficient settling or is scoured from the tubes into the effluent. When the entire sludge storage capacity of the settling tubes 14 has been utilized, the sludge can be removed from the apparatus simply by closing the inlet 11 and the outlet pipe 18 and opening a valve 20 in the exit reservoir 16 and a sludge drain valve 22 in the inlet reservoir 12. Since the settling tubes 14 are inclined slightly upwardly in the direction of flow therethrough, that is, in the direction from the inlet reservoir 12 to the exit reservoir 16, the sludge is removed hydraulically as the settling tubes drain by gravity.

It is important that the inlet reservoir 12 be drained such that the water level therein drops at a rate of between about six to eighteen inches per minute. With a faster drop the deposited sludge is in effect left behind by rapidly exiting water and with a slower drop the rate of flow within the tubes is so slow as not to perform the necessary scouring action upon the deposited material.

An important advantage of the present invention is that substantially all of the sludge can be removed merely by this drainage which occurs tube by tube as the water level in the reservoir 12 is gradually lowered, and it is unnecessary to provide backwash water to effect cleaning. The sludge that is removed through the drain valve 22 can be dewatered in a decant tank (not shown) and the recovered water returned to the process, with the separated sludge being withdrawn to waste.

The small volume of the settling device makes relatively frequent draining for sludge removal practical whereas the volume of water which would be lost from larger basins would make this method of sludge removal impractical. The relatively frequent draining also prevents sludge deposits from compacting to a degree such that backwashing of the tubes would be required thereby achieving a further economy in operation.

The tubular structure 13 which comprises the settling tubes 14 may consist of circular, hexagonal, rectangular or square tubes. FIG. 2 illustrates a tubular structure 13 formed of circular cylindrical tubes 60 of any suitable material such as, for example, polyethylene, polyvinylchloride or ABS copolymer.

FIG. 3 illustrates a tubular structure 13, in which the settling tubes 64 comprise a plurality of hexagonal passageways 66. This type of honeycomb structure can also be made from polyethylene, polyvinylchloride or ABS copolymer.

FIG. 4 illustrates a tubular structure 13 also formed of polyethylene, polyvinylchloride or ABS copolymer, in which the settling tubes 68 comprise a plurality of square passageways 70.

FIG. 5 illustrates a tubular structure 13 in which rectangular passageways 72 are formed between sheets 74 of steel, plastic, or other fluid-impervious material. The sheets 74 are spaced apart and supported by steel channels 76.

FIG. 6 illustrates a tubular structure 13 in which the passageways 78 are formed between corrugated sheets 80 of steel, fiberglass or polyvinylchloride. The sheets 80 are assembled so that the valleys of one sheet are in contact with the peaks of the adjacent sheets, thereby to form the necessary tube-like channels therebetween.

Where the tubular structure 13 comprises a plurality of individual tubes 14 as shown in FIG. 1, the flow distribution to the individual tubes must be taken into consideration in the design thereof. Without proper distribution, the full storage capacity of the tubular structure 13 cannot be fully utilized and full use of the capacity is important in realizing the full economic advantage of the device. We have found that with tubes having a diameter less than about three inches or an equivalent cross-sectional area of about seven square inches, sludge deposition serves as the mechanism for imparting a self-orificing condition. This will occur when a sludge layer builds up in the tubular spaces of certain of the tubes 14, thereby to constrict the flow in them until the increased resistance diverts the flow to other tubes. In this way, equal distribution of sludge in all tubes can be achieved. The angle of inclination of the tube is of importance in establishing this self-orificing effect. If the angle exceeds 35° to 50°, the sludge that settles to the tube bottom slides down the tube bottom and exits the tubes thereby eliminating the sludge deposits which establish the self-orificing effect described above. It is advantageous to incline the tubes at the minimum angle which permits sludge removal by draining (5°–10° in most cases) to insure that sludge deposition will provide self-orificing. The self-orificing phenonema allows tubes of uniform cross-section to be used thereby providing significant economies over other systems in which artificial orificing or mechanical flow distribution systems are required.

The shallow settling depth which is characteristic of the settling tubes of the present invention permits operation at much higher hydraulic cross-sectional surface area loading rates than is possible with either the horizontal or vertical clarifier types of tanks. We have found it possible in the clarification of raw water to achieve area loadings of 10 gallons per minute per square foot with a minimum addition of coagulant. This, of course, must be compared with the 0.5 to 2.0 gallons per minute per square foot surface loading heretofore obtainable in horizontal or upflow units.

To achieve maximum efficiency from a tube settling apparatus, however, the addition of coagulant aid is desirable. The addition of coagulant aid increases the size and improves the settling characteristics of the floc obtained. By controlling the dosage of coagulant aid, practically any desired quality of effluent can be obtained. The coagulant aid should preferably be added to a flocculating device just prior to introducing the liquid into the settling tube. Induced turbulence in the flocculator will provide the action necessary for adequate flocculation. With the addition of a polyelectrolyte type of coagulant aid, reductions in turbidity have been achieved which approached 98% even at the highest loading rates. In one test in which a loading rate of 14.3 gallons per minute per square foot of tube cross-sectional area was used, 80 mg. per liter of alum and 1.5 mg. per liter of Magnafloc 990 brand of coagulant aid were added to a turbid water prior to passing it through a settling tube having a 1 inch settling depth. A reduction in turbidity from 500 turbidity units (T.U., as described in "Standards Methods for the Examination of Water and Waste Water," American Public Health Association, 12th ed., 1965) to 10 T.U. or 98%, was achieved. Based on this test, it is estimated that cross-sectional loading rates approaching 15 gallons per minute per square foot of settler cross-sectional area could be achieved if adequate amounts of coagulant aid were used.

The settling tube of the instant invention is particularly effective when used in conjunction with the MICROFLOC multi-media filter disclosed in patent application, Ser. No. 345,204, Filter and Method of Making Same, filed Feb. 17, 1964 by Archie H. Rice and Walter R. Conley. The filter of such application comprises a bed of particles of increasing number in the direction of flow, the media being of at least three different specific gravities and there being at least five percent by weight of a media of each specific gravity present. The particles in such media range in size from about minus 10 to plus 100 U.S. mesh size and such bed may have a depth of about 24 inches and may, for example, comprise between about 7 to 30 percent by weight garnet particles of between about minus 40 plus 100 U.S. mesh size; between about 7 to 35 percent by weight graphitic rock of between about minus 20 plus 50 U.S. mesh size; and between about 30 to 65 percent by weight anthracite of between about minus 20 plus 20 U.S. mesh size. Such a bed is oriented for filtering by backwashing the bed at a velocity so that the particles are all fluidized. Upon cessation of the backwash the bed will settle with the particles distributed such that there is a substantially continually increasing number of particles in the downward direction, that is, in the direction of flow through the filter.

Detention time of the liquid passing therethrough is considerably reduced in the apparatus of the invention as compared to conventional settling tanks and basins. The compact size of the tubular structure results in reduced space requirements which, of course, is quite important where land costs are high. Furthermore, the present invention permits the development of compact portable water and waste treatment plants.

The settling apparatus of the present invention can also be adapted for use in sub-zero weather, thereby to facilitate development of sub-Arctic natural resources. In such climates all equipment must be housed in heated shelters to prevent freezing. To cover a large settling tank or basin obviously requires a very large structure. The compact size of the apparatus of the present invention will minimize such housing requirements and building costs.

Another major advantage of the present invention is that it will permit the development of a completely pressurized water treatment plant from the raw water intake pumps through the flocculation, sedimentation and filtration equipment. Pressurization of an entire system, with the consequent elimination of the need for additional pumps, is extremely desirable for package plant applications. With such pressurized apparatus, the disturbing conditions which affect the efficiencies of conventional settling units, such as the formation of turbulence, currents and eddies, will be completely eliminated.

The compact size of the apparatus of the present invention also will reduce field construction time. Thus, the major portion of the construction work can be completed by fabricators off the site and only the assembly will be required in the field. Finally, the ability to remove sludge quickly and simultaneously with the backwashing of the filter is another important advantage.

As an illustration of the space savings achieved by the apparatus of the present invention, a horizontal settling tank that can treat one million gallons per day would have to be 20 feet by 60 feet by 15 feet. A vertical clarifier unit to treat the same flow would be 30 feet in diameter by 8 feet deep. An apparatus in accordance with the present invention for treating this quantity of water would require only approximately 6 feet by 8 feet by 10 feet.

In the foregoing description, the invention has been described with reference to certain particular preferred embodiments, though it is to be understood that the specific details shown are merely illustrative and that the invention may be carried out in other ways without departing from the true spirit and scope of the appended claims.

We claim:
1. The method of removing settleable material from a liquid carrying the same comprising:
   providing a honey-comb structure defining a plurality of elongated substantially horizontal conduits disposed between a pair of plenums defining an inlet plenum and an exit plenum, said conduits each being of uniform cross section from end-to-end no greater than about seven square inches,
   said conduits being inclined slightly upwardly from said inlet plenum to said outlet plenum.
   feeding said liquid carrying settleable material to said inlet plenum at a rate such that the liquid assumes a streamline flow condition in each of said conduits thereby facilitating depositing of said material in said tubes, the uniform restricted cross section of said tubes causing self-orificing therein to effect uniform distribution of settled materials in said tubes, periodically terminating the feeding of said liquid to said inlet plenum and thereafter draining said inlet plenum so as to drain the liquid from each of said conduits and thereby effect draining of settled materials from the bottoms of said conduits.

2. The method of claim 1 wherein said inlet plenum is drained so that the water level therein drops at a rate between about six and eighteen inches per minute.

3. The method of claim 2 wherein said tubes are inclined at an angle of between about five and ten degrees to the horizontal.

4. The method of claim 2 wherein said tubes are inclined at an angle of between about five and thirty five degrees to the horizontal.

5. The method of claim 1 wherein said liquid is passed from said outlet plenum through a filter comprising a bed of particles of increasing number in the direction of flow.

6. The method of claim 5 wherein said particles range in size from about minus 10 to plus 100 U.S. mesh size.

References Cited

UNITED STATES PATENTS

| 3,097,163 | 7/1963 | Riddick | 210—53 |
| 3,269,542 | 8/1966 | Renzi et al. | 210—17 X |

FOREIGN PATENTS

| 994,118 | 8/1951 | France. |
| 16,743 | 1884 | Great Britain. |
| 907 | 1886 | Great Britain. |
| 746,980 | 3/1956 | Great Britain. |

MICHAEL E. ROGERS, *Primary Examiner.*